United States Patent
Fujiwara et al.

(10) Patent No.: US 7,648,193 B2
(45) Date of Patent: Jan. 19, 2010

(54) VIBRATION-ISOLATING SUPPORTING STRUCTURE

(75) Inventors: Nobuhiro Fujiwara, Yokohama (JP); Kiyoshi Oozu, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 402 days.

(21) Appl. No.: 11/601,814

(22) Filed: Nov. 20, 2006

(65) Prior Publication Data
US 2007/0131470 A1    Jun. 14, 2007

(30) Foreign Application Priority Data
Nov. 18, 2005    (JP) ............................. 2005-333953

(51) Int. Cl.
*B60J 9/00* (2006.01)
(52) U.S. Cl. .............................. 296/190.07; 180/89.12; 180/89.13
(58) Field of Classification Search ............ 296/190.07; 180/89.12, 89.13
See application file for complete search history.

(56) References Cited

U.S. PATENT DOCUMENTS 6,029,764 A * 2/2000 Schubert .................. 180/89.13

FOREIGN PATENT DOCUMENTS

| JP | 5-125745 A | 5/1993 |
|---|---|---|
| JP | 5-178586 A | 7/1993 |
| JP | 2001-323510 A | 11/2001 |

* cited by examiner

*Primary Examiner*—Lori L Lyjak
(74) *Attorney, Agent, or Firm*—Sughrue Mion, PLLC

(57) ABSTRACT

A frame of a vehicle supports a cabin via four vibration-isolating apparatuses. A vibration-isolating supporting plane, which contains the four vibration-isolating apparatuses, passes through a center of gravity point G of the cabin. Due to an arranged structure of the vibration-isolating apparatuses, shaking of the center of gravity point of the cabin due to vibration transferred from the frame at times of riding on poor roads or at times of operation can be kept small, as compared with a vibration-isolating supporting structure in which the vibration-isolating supporting plane is far apart from the center of gravity point G. A vibration-isolating supporting structure which does not increase shaking of a center of gravity of the cabin is provided.

10 Claims, 7 Drawing Sheets

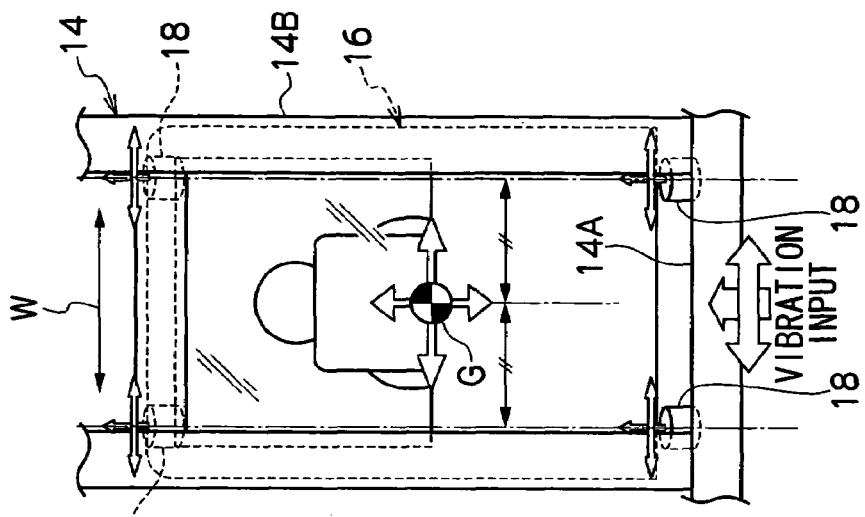
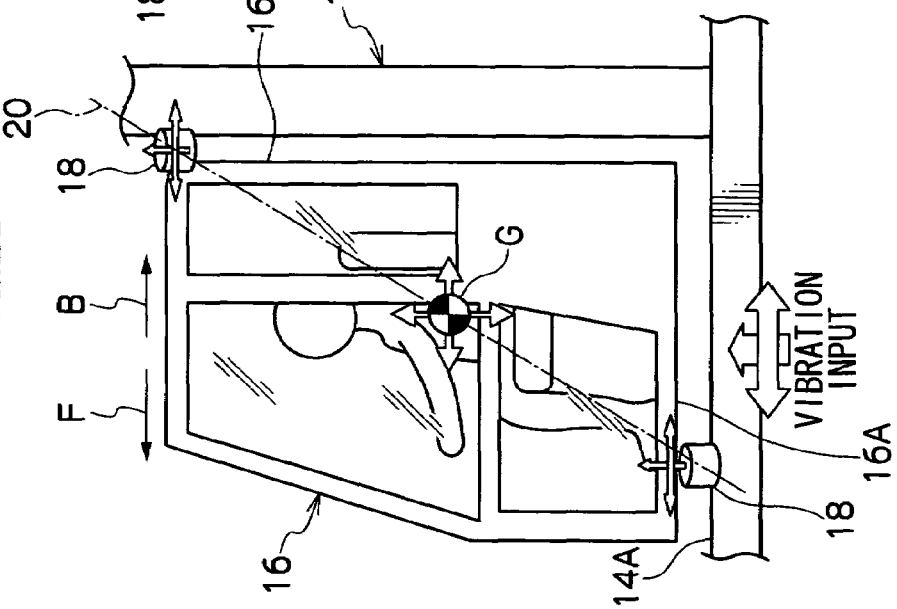
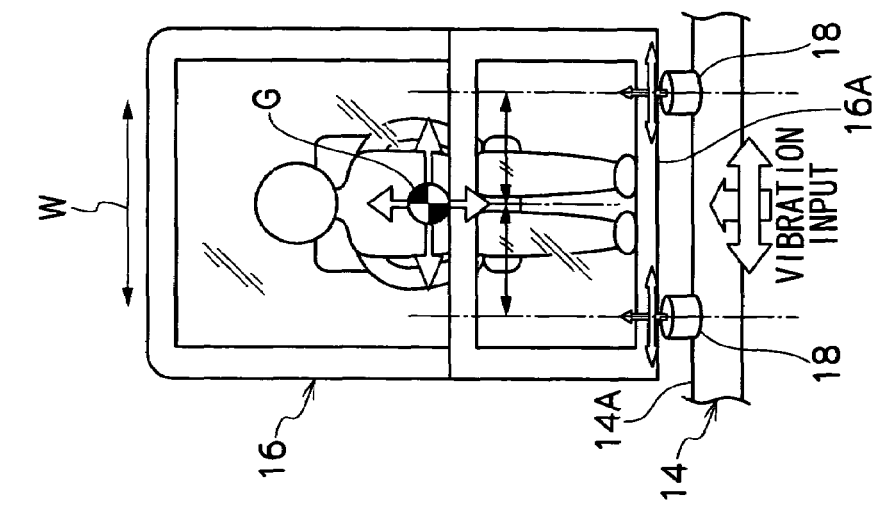

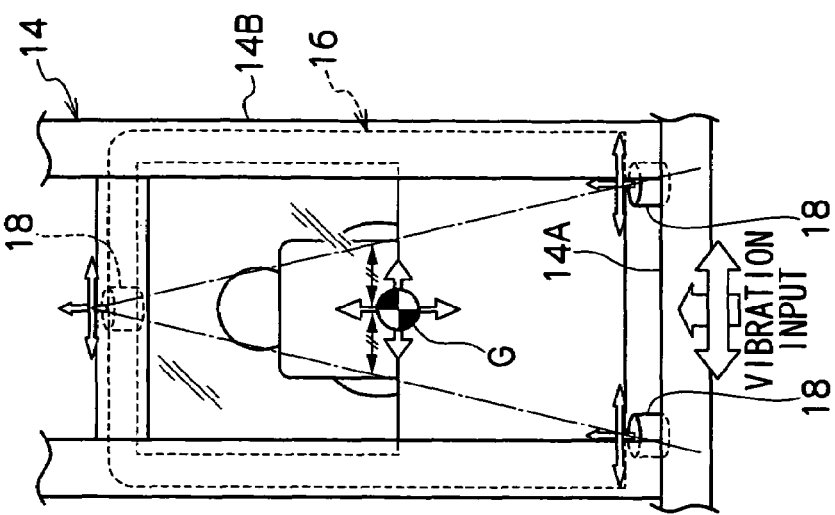
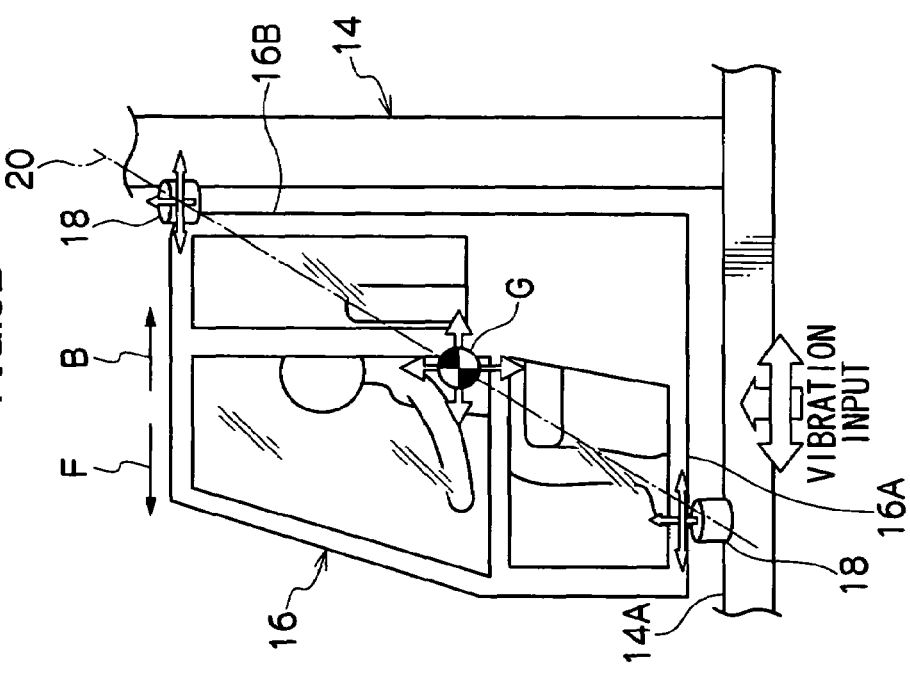
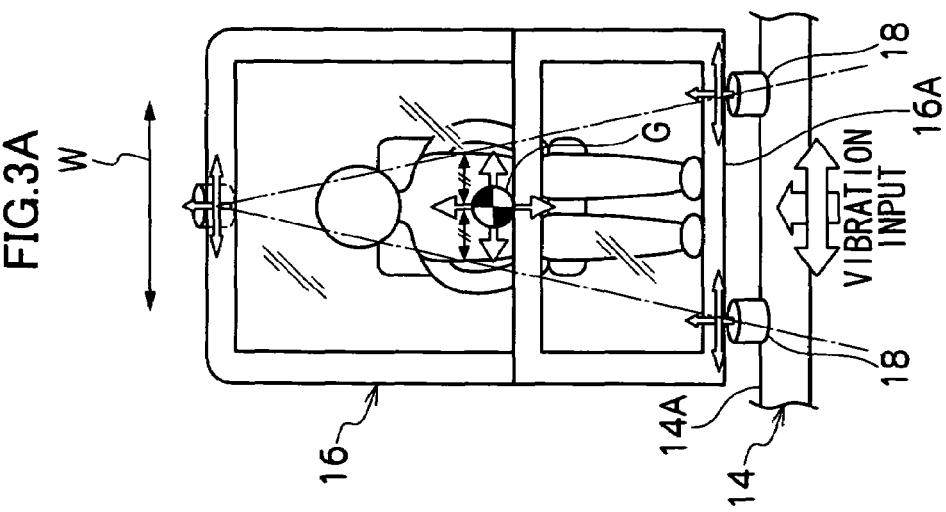

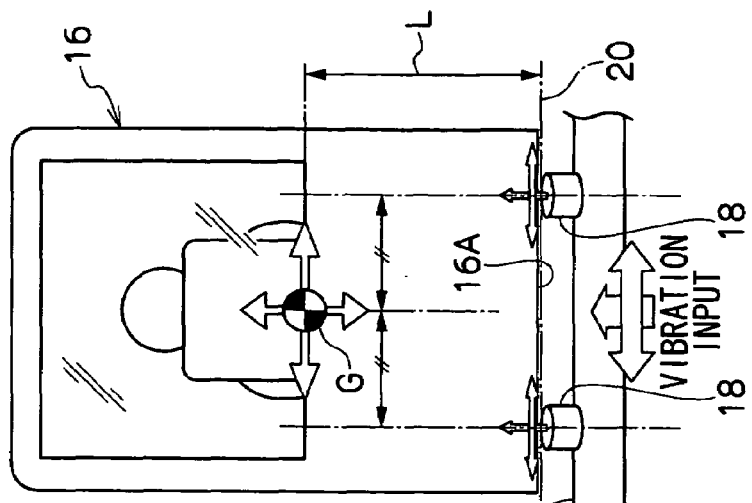
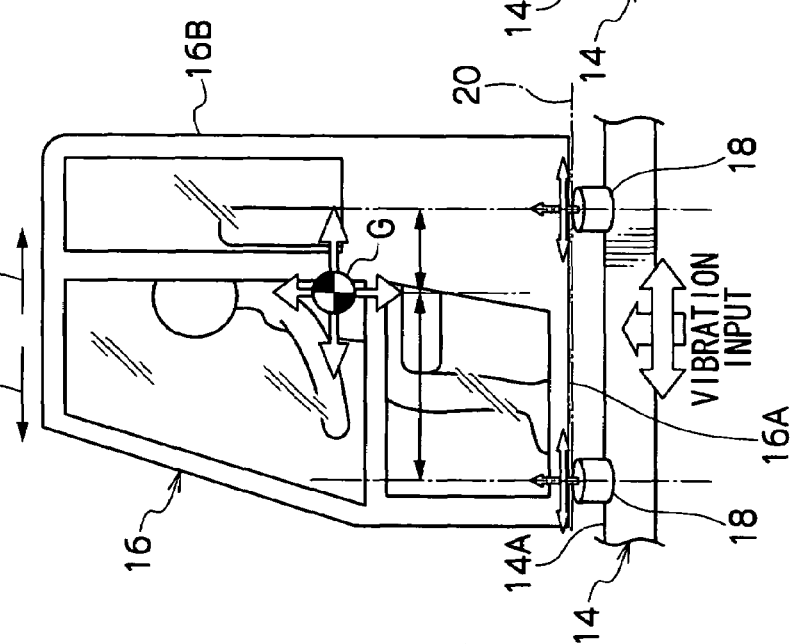
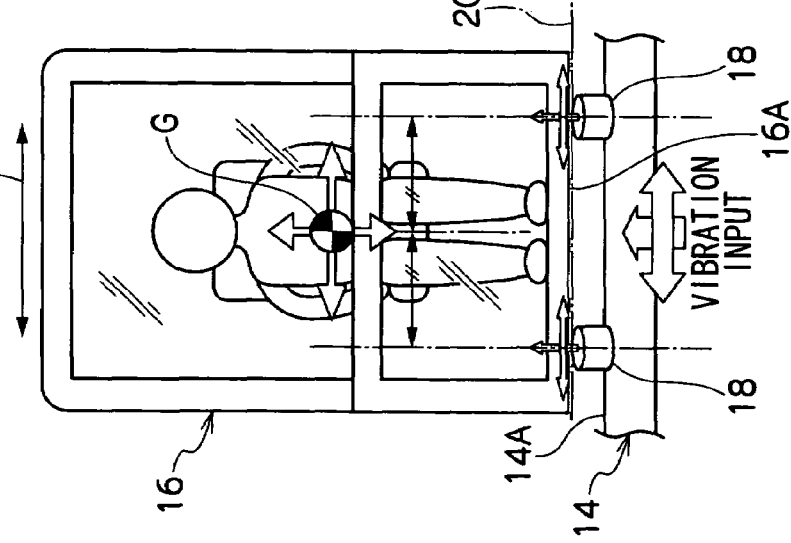

VIBRATION-ISOLATING SUPPORTING STRUCTURE

CROSS-REFERENCE TO RELATED APPLICATION

This application claims priority under 35 USC 119 from Japanese Patent Application No. 2005-333953, the disclosure of which is incorporated by reference herein.

BACKGROUND OF THE INVENTION

1. Field of the Invention

The present invention relates to a vibration-isolating supporting structure which supports a second member at a first member via plural vibration-isolating apparatuses.

2. Description of the Related Art

Industrial vehicles (vehicles for construction, building, engineering, and vehicles for agriculture, and the like), which a worker (operator) rides in, have a cabin in which the worker rides. In assembling the cabin to the vehicle body, a vibration-isolating member is mounted between the cabin and the vehicle body due to the need to mitigate vibration, shock, noise and the like during traveling and during operation. Due to structural constraints on industrial vehicles in general, the cabin is generally set on a frame which structures a main body, and the vibration-isolating member is, of necessity, set at the upper side of the frame and the lower side of the cabin (refer to Japanese Patent Applications Laid-Open (JP-A) Nos. 5-125745 and 2001-323510).

Because the input of vibration, shock or the like propagates from the frame, the vibration, shock or the like is transferred to the cabin via the vibration-isolating member. However, the center of gravity position of the cabin is positioned higher than the supporting surface to which the vibration-isolating member is mounted. Therefore, there is the drawback that, the greater the distance from the vibration-isolating plane, the greater the "shaking" due to propagated vibration.

Because the "shaking" becoming great relates to a deterioration in the comfort of the ride, vibration-isolating members, which are filled with a viscous fluid and whose damping force is large, are often used as the vibration-isolating members in such applications. Note that making the springs hard can also make the "shaking" small, but works disadvantageously with respect to vibration transfer, and is also disadvantageous with respect to cutting-off noise which propagates into the cabin. Therefore, there is the trend toward demanding pliant supporting springs of a vibration-isolating member.

Further, there are also examples in which, in some vehicles, the vibration-isolating supporting plane is structured above the cabin roof and the cabin is supported in a state of being suspended (refer to JP-A No. 05-178586). However, the positional relationship with the center of gravity point of the cabin is the same as that described above, and there is the problem that the "shaking" cannot be kept small unless the damping force is made to be large, or the springs are made to be hard, or stoppers or the like are used.

In order to make the shaking of the cabin small, it has been thought to use a liquid-filled-type vibration-isolating apparatus having high damping force. However, the structure of this type of vibration-isolating apparatus is special, and is also expensive.

Further, from the standpoint of ensuring the safety of the worker in an industrial vehicle, cabin strength has been improved recently. The weight supported by the vibration-isolating member has increased, and, as the weight of the cabin has increased, the vibration energy on the springs also has become large, and there is the need for further improvement in the damping force.

SUMMARY OF THE INVENTION

In view of the aforementioned, an object of the present invention is to provide a vibration-isolating supporting structure which has a simple structure and does not increase shaking of the center of gravity of a second member.

A vibration-isolating supporting structure of an aspect of the present invention is vibration-isolating supporting structure having: a first member working as a source of vibration; a second member supported by the first member; and a plurality of vibration-isolating apparatuses mounted between the first member and the second member, the second member being supported at the first member via the plurality of vibration-isolating apparatuses, wherein the plurality of vibration-isolating apparatuses are disposed such that a vibration-isolating supporting plane, which is demarcated by an imaginary plane that contains the plurality of vibration-isolating apparatuses, substantially passes through a center of gravity point of the second member.

Next, operation of the vibration-isolating supporting structure of the above-described aspect of the present invention will be explained.

In the vibration-isolating supporting structure of the above-described aspect of the present invention, the vibration-isolating supporting plane, which is imaginary and planar and contains the plurality of vibration-isolating apparatuses, passes through the center of gravity point of the second member. Therefore, as compared with a vibration-isolating supporting structure in which the vibration-isolating supporting plane is apart from the center of gravity point, shaking of the center of gravity point of the second member at the time of input of vibration can be kept small.

In the vibration-isolating supporting structure of the above-described aspect of the present invention, the first member may be a frame of a vehicle, and the second member may be a cabin of the vehicle.

Operation of the above-described vibration-isolating supporting structure will be explained next.

In the vibration-isolating supporting structure having the above-described structure, the vibration-isolating supporting plane, which is imaginary and planar and contains the plurality of vibration-isolating apparatuses, passes through the center of gravity point of the cabin. Therefore, as compared with a vibration-isolating supporting structure in which the vibration-isolating supporting plane is apart from the center of gravity point, shaking of the center of gravity point of the cabin at the time of input of vibration can be kept small.

In the vibration-isolating supporting structure of the above-described structure, the cabin may be supported at the frame via at least one vibration-isolating apparatus which is disposed further toward a front side of the vehicle than the center of gravity point and further toward a lower side than the center of gravity point, and at least one vibration-isolating apparatus which is disposed further toward a rear side of the vehicle than the center of gravity point and further toward an upper side than the center of gravity point.

Operation of the vibration-isolating supporting structure of the above-described structure will be explained next.

In the vibration-isolating supporting structure of the above-described structure, the at least one vibration-isolating apparatus which is disposed lower than the center of gravity point mainly supports the load of the cabin, and the at least one vibration-isolating apparatus which is disposed higher than the center of gravity point suppresses shaking of the cabin.

As described above, the vibration-isolating supporting structure of the present invention has the excellent effect of not increasing shaking of the center of gravity of the cabin.

BRIEF DESCRIPTION OF THE DRAWINGS

FIG. 2A is a front view of a cabin and a frame, FIG. 2B is a side view of the cabin and the frame, and FIG. 2C is a rear view of main portions of the cabin and the frame;

FIG. 3A is a front view of a cabin and a frame relating to another exemplary embodiment, FIG. 3B is a side view of the cabin and the frame relating to the other exemplary embodiment, and FIG. 3C is a rear view of main portions of the cabin and the frame relating to the other exemplary embodiment;

FIG. 4A is a front view of a cabin and a frame relating to a conventional example, FIG. 4B is a side view of the cabin and the frame relating to the conventional example, and FIG. 4C is a rear view of main portions of the cabin and the frame relating to the conventional example;

DETAILED DESCRIPTION OF THE INVENTION

Exemplary embodiments of the present invention will be described in detail hereinafter with reference to the drawings.

Figure 1:
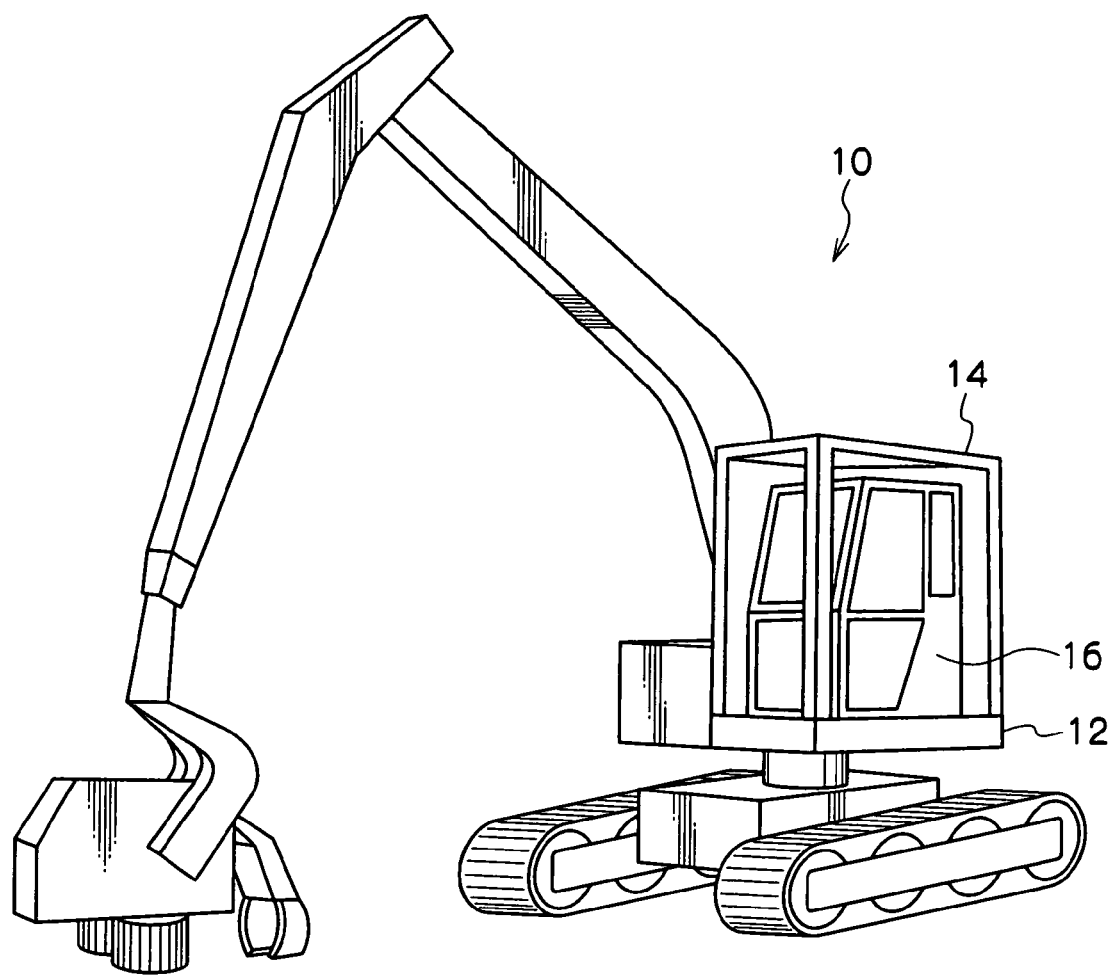
FIG. 1 is a perspective view of a vehicle to which a vibration-isolating supporting structure of the present invention is applied.

FIG. 1 is a perspective view of a vehicle 10 for forestry to which the vibration-isolating supporting structures relating to the exemplary embodiments of the present invention are applied.

A frame 14, which is frame-shaped, has high rigidity, and is formed of a metal member, is provided at a vehicle body 12 of the vehicle 10. A box-shaped cabin 16 in which the worker rides is disposed at the inner side of the frame 14.

As shown in FIGS. 2A through 2C, a center of gravity point G of the cabin 16 is at the substantially central portion of the cabin 16. The side of a floor portion 16A of the cabin 16 toward the front of the vehicle (the side in the direction of arrow F in FIG. 2B) is supported at a lower portion 14A of the frame 14 via a pair of vibration-isolating apparatuses 18 which are disposed with an interval therebetween in the transverse direction of the vehicle (the direction of arrow W in FIGS. 2A and 2C).

A rear wall 16B of the cabin 16 at the side toward the rear of the vehicle (the side in the direction of arrow B) is supported at a vertical portion 14B of the frame 14 via a pair of the vibration isolating apparatuses 18 which are disposed with an interval therebetween in the transverse direction of the vehicle. Apparatuses having a relatively low spring constant and a high damping force, e.g., liquid-filled-type apparatuses, are used as these vibration-isolating apparatuses 18.

Given that an imaginary plane which includes these four vibration-isolating apparatuses 18 is a vibration-isolating supporting plane 20 (shown by the two-dot chain line in FIG. 2B), in the present exemplary embodiment, the vibration-isolating supporting plane 20 passes through the center of gravity G of the cabin 16.

(Operation)

In the vehicle 10 of the present exemplary embodiment, the vibration-isolating apparatuses 18 which are disposed lower than the center of gravity point G mainly support the load of the cabin 16, whereas the vibration-isolating apparatuses 18 which are disposed higher than the center of gravity point G mainly function to suppress shaking of the cabin. Further, the vibration-isolating supporting plane 20 which contains the four vibration-isolating apparatuses 18 passes through the center of gravity point G of the cabin 16. Therefore, as compared with a vibration-isolating supporting structure such as that shown in FIG. 4 in which the vibration-isolating supporting plane 20 is far apart from the center of gravity point G (by distance L), shaking of the center of gravity point of the cabin 16 due to vibration from the frame 14 at times of traveling on poor roads or at times of operation can be kept to be small.

Another Exemplary Embodiment

Although the cabin 16 is supported at the four vibration-isolating apparatuses 18 in the above-described exemplary embodiment, the present invention is not limited to the same. As shown in FIGS. 3A through 3C, the floor portion 16A of the cabin 16 may be supported at two of the vibration-isolating apparatuses 18 in the same way as in the above-described exemplary embodiment, and the transverse direction center of the upper portion of the rear wall 16B of the cabin 16 may be supported at one vibration-isolating apparatus 18. In this case as well, because the vibration-isolating supporting plane 20 passes through the center of gravity G of the cabin 16, shaking of the center of gravity point of the cabin 16 due to vibration inputted from the frame 14 can be kept to be small.

Although the vibration-isolating supporting plane 20 passes through the center of gravity point G of the cabin 16 in the above-described exemplary embodiments, the vibration-isolating supporting plane 20 may be slightly apart from the center of gravity point G However, the allowable range, which is good even if the vibration-isolating supporting plane 20 is apart from the center of gravity point G, is as described hereinafter.

First, given that the height of the cabin 16 is H, the front-back direction length of the cabin is L, and the width of the cabin 16 is Bw, if the vibration-isolating supporting plane 20 is set at any of at or within $\pm(\frac{1}{4}) \times H$ in the heightwise direction from the center of gravity point G, and at or within $\pm(\frac{1}{4}) \times L$ in the front-back direction from the center of gravity point G, and at or within $\pm(\frac{1}{4}) \times Bw$ in the transverse direction from the center of gravity point G, the vibration-isolating supporting plane 20 is positioned in a vicinity of the center of gravity point G, and the effects of the present invention are sufficiently achieved. Namely, it suffices for the vibration-isolating supporting plane to exist in the parallelepiped space which is demarcated by the above-described dimensions (from the center of gravity point G) and centered around the center of gravity point G.

Further, in the above-described exemplary embodiments, the lower side of the front of the cabin 16 and the upper side of the rear of the cabin 16 are supported at the vibration-isolating apparatuses 18. However, provided that the vibration-isolating supporting plane 20 is positioned in a vicinity of the center of gravity point G, the positions of the vibration-isolating apparatuses 18 are not limited to the same. For example, the cabin 16 may be supported at vibration-isolating apparatuses 18 which are disposed at the upper side of the front of and the lower side of the rear of the cabin 16. Or, the cabin 16 may be supported at vibration-isolating apparatuses 18 which are disposed at the upper left side and the lower right side thereof Or, the cabin 16 may be supported at vibration-isolating apparatuses 18 which are disposed at the upper right side and the lower left side thereof.

EXPERIMENTAL EXAMPLES

In order to confirm the effects of the present invention, conventional supporting structures and supporting structures of the present invention were trial-manufactured by using a cabin of a width of 1300 mm, a front-back length of 1300 mm, and a height of 1800 mm, and the vibration-isolating effects thereof were compared.

Comparative Example 1

The four corners of the bottom surface of the cabin were supported at liquid-filled-type vibration-isolating apparatuses having relatively high damping forces.

Comparative Example 2

The four corners of the bottom surface of the cabin were supported at vibration-isolating apparatuses of rubber alone whose damping forces were lower than that of a liquid-filled-type vibration-isolating apparatus.

Example 1

Using the same vibration-isolating apparatuses as in Comparative Example 2, the front of the cabin was supported at lower than the center of gravity point and the rear of the cabin was supported at higher than the center of gravity point, in an arrangement such that the vibration-isolating supporting plane passed through the center of gravity point.

Example 2

The supporting of the front of the cabin was the same as in Example 1, but, by moving the positions of support of the rear of the cabin, the vibration-isolating supporting plane was shifted in the vertical direction from the center of gravity point to the limit of the range of 0.25 H.

Comparative Example 3

The supporting of the front of the cabin was the same as in Example 1, but, by moving the positions of support of the rear of the cabin, the vibration-isolating supporting plane was set far apart to a place exceeding 0.25 H in the vertical direction from the center of gravity point.

In this experiment, the same vibrating force was applied to each experimental example, and the amplitude angle around the center of gravity point at that time was measured.

Experimental Results

Figure 5:
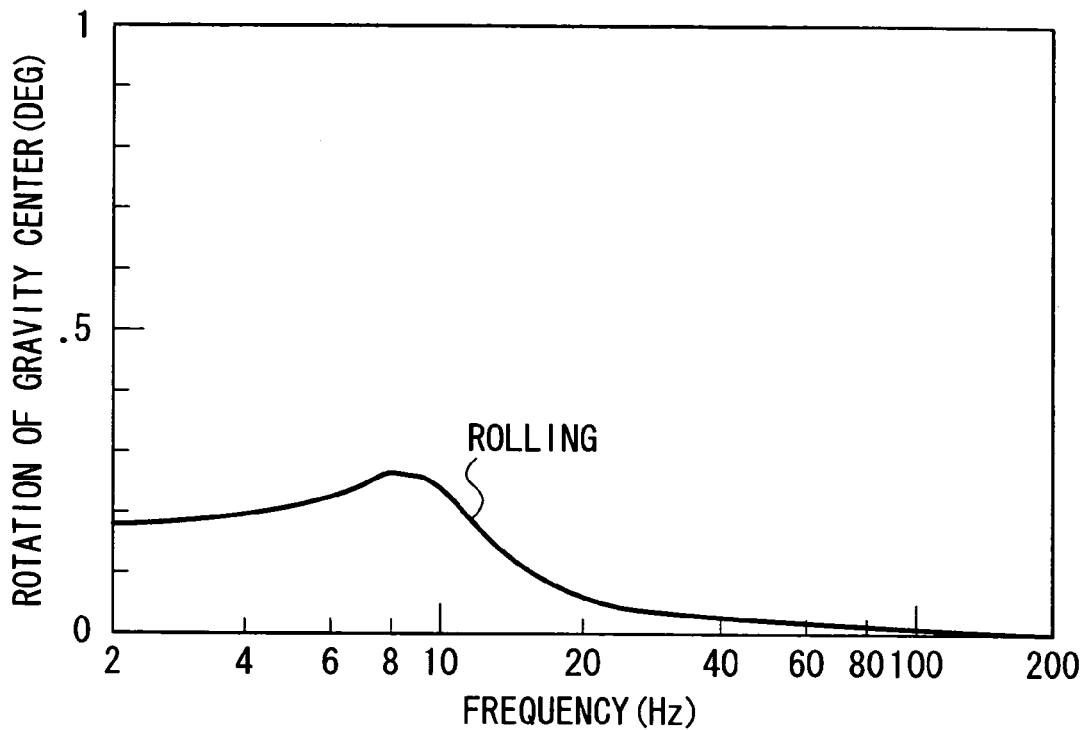
FIG. 5 is a graph showing experimental results of Comparative Example 1.
Figure 6:
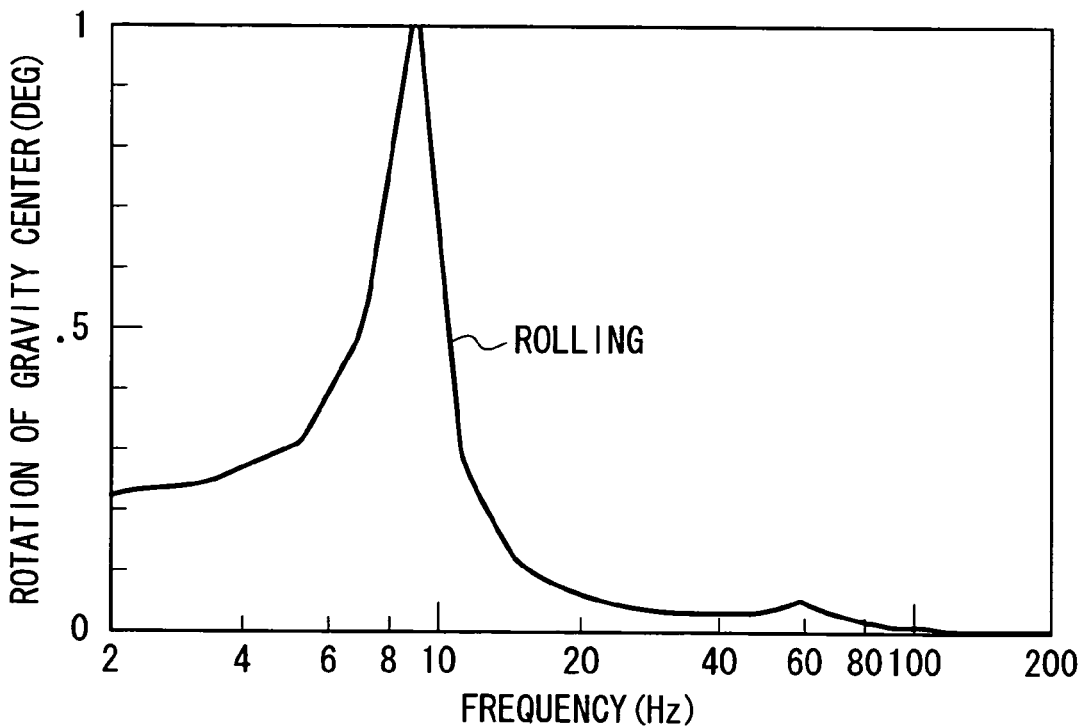
FIG. 6 is a graph showing experimental results of Comparative Example 2.
Figure 7:
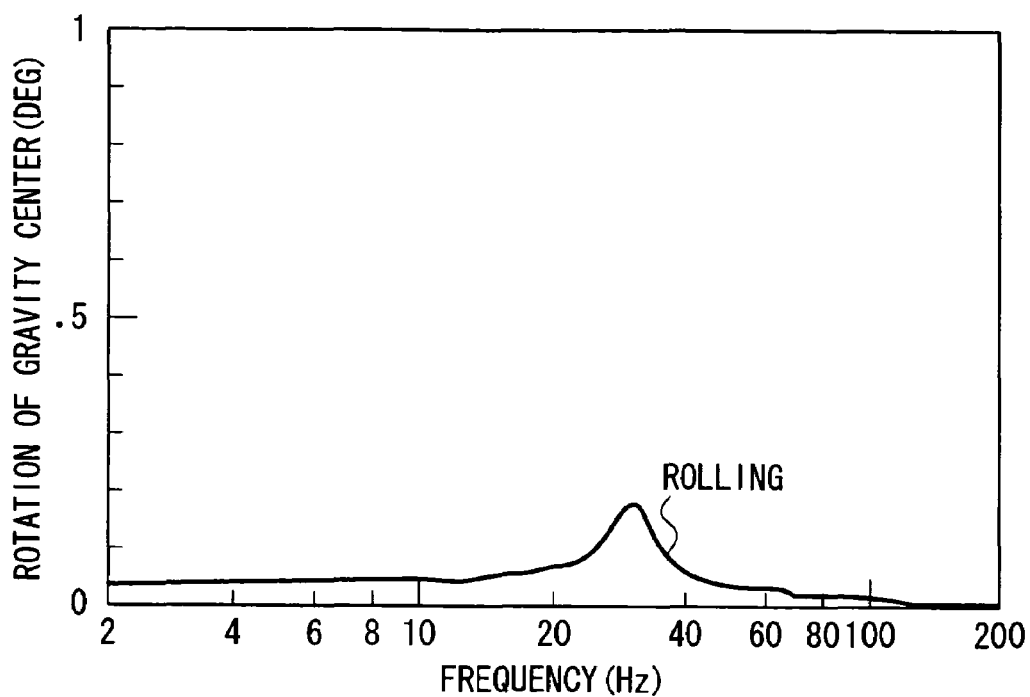
FIG. 7 is a graph showing experimental results of Example 1.
Figure 8:
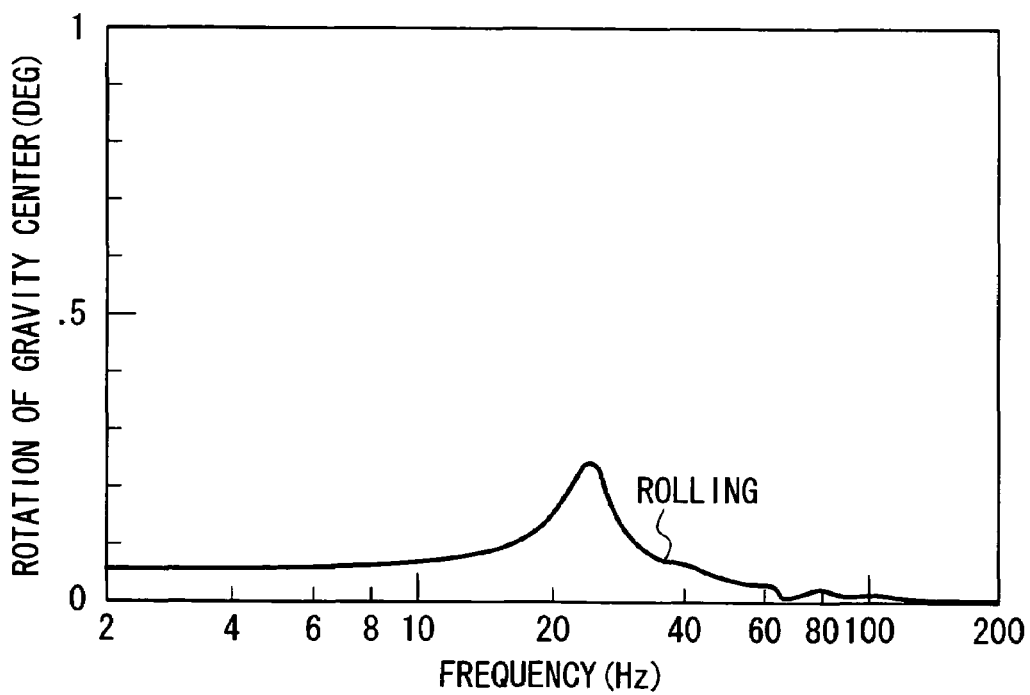
FIG. 8 is a graph showing experimental results of Example 2.
Figure 9:
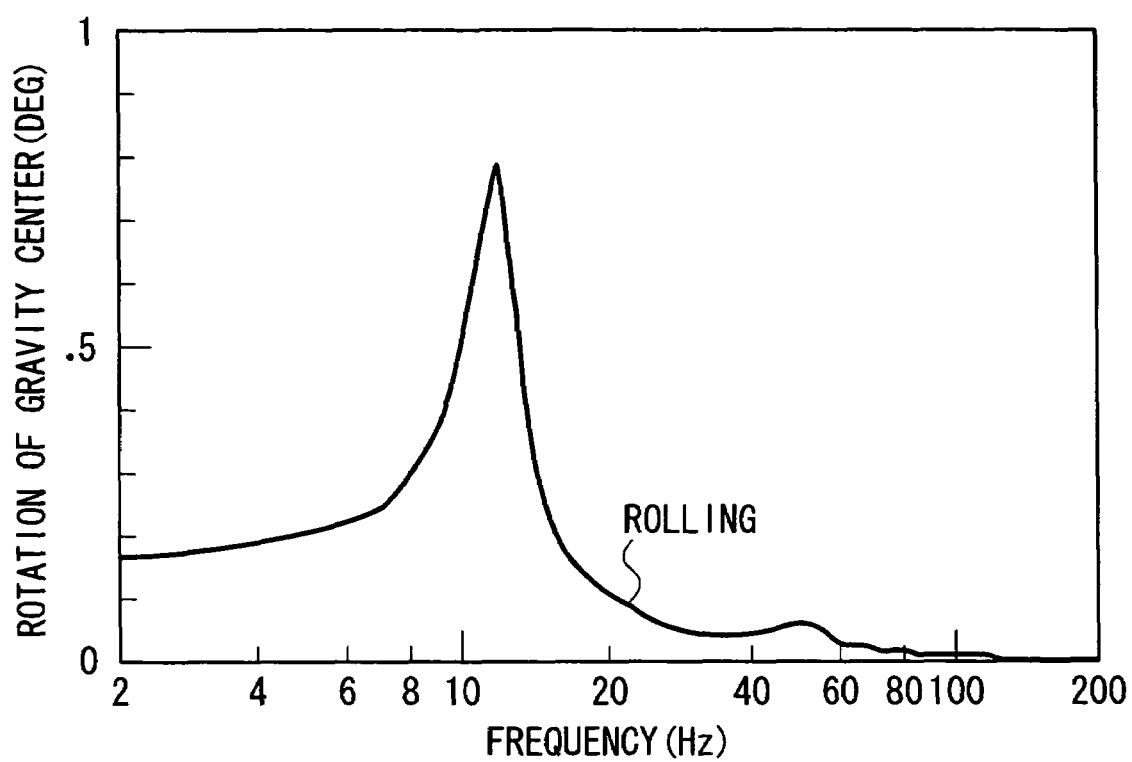
FIG. 9 is a graph showing experimental results of Comparative Example 3.

The results of Comparative Example 1 are as shown in the graph of FIG. 5, the results of Comparative Example 2 are as shown in the graph of FIG. 6, the results of Example 1 are as shown in the graph of FIG. 7, the results of Example 2 are as shown in the graph of FIG. 8, and the results of Comparative Example 3 are as shown in the graph of FIG. 9. Note that, in each of the graphs, the vertical axis is the amplitude angle (deg) around the center of gravity point, and the horizontal axis is the frequency of the vibration.

TABLE 1

|  | comp. ex. 1 | comp. ex. 2 | ex. 1 | ex. 2 | comp. ex. 3 |
| --- | --- | --- | --- | --- | --- |
| amplitude angle (maximum value) | 0.3 deg | greater than or equal to 1 deg | 0.2 deg | 0.3 deg | 0.8 deg |

From the above experimental results, it can be understood that, in Examples 1 and 2, regardless of the fact that inexpensive vibration-isolating apparatuses formed only of rubber and having a low damping ratio were used, the amplitude angle around the center of gravity point was kept to the same level as or lower than that of Comparative Example 1 which used the complex and expensive liquid-filled-type vibration-isolating apparatuses, and a good vibration-isolating performance was achieved.

What is claimed is:

1. A vibration-isolating supporting structure comprising:
a first member working as a source of vibration;
a second member supported by the first member; and
a plurality of vibration-isolating apparatuses mounted between the first member and the second member, the second member being supported at the first member via the plurality of vibration-isolating apparatuses,
wherein the plurality of vibration-isolating apparatuses are disposed such that a vibration-isolating supporting plane, which is demarcated by an imaginary plane that contains the plurality of vibration-isolating apparatuses, substantially passes through a center of gravity point of the second member.

2. The vibration-isolating supporting structure of claim 1, wherein the first member is a frame of a vehicle, and the second member is a cabin of the vehicle.

3. The vibration-isolating supporting structure of claim 2, wherein the cabin is supported at the frame via at least one of the plurality of vibration-isolating apparatuses which is disposed further toward a front side of the vehicle than the center of gravity point and further toward a lower side than the center of gravity point, and at least one of the plurality of vibration-isolating apparatuses which is disposed further toward a rear side of the vehicle than the center of gravity point and further toward an upper side than the center of gravity point.

4. A vibration-isolating supporting structure comprising:
a first member working as a source of vibration;
a second member supported by the first member; and
a plurality of vibration-isolating apparatuses mounted between the first member and the second member, the second member being supported at the first member via the plurality of vibration-isolating apparatuses,
wherein the plurality of vibration-isolating apparatuses are disposed such that a vibration-isolating supporting plane, which is demarcated by an imaginary plane that contains the plurality of vibration-isolating apparatuses, passes through a space in a vicinity of a center of gravity point of the second member.

5. The vibration-isolating supporting structure of claim 4, wherein the first member is a frame of a vehicle, and the second member is a cabin of the vehicle.

6. The vibration-isolating supporting structure of claim 5, wherein, given that a height of the cabin is H, a length of the cabin in a front-back direction is L, and a width of the cabin is Bw, the space in the vicinity is demarcated by a parallelepiped having dimensions, centered around the center of gravity point, of $\pm(1/4) \times H$ in a heightwise direction of the cabin, $\pm(1/4) \times L$ in the front-back direction of the cabin, and $\pm(1/4) \times Bw$ in a transverse direction of the cabin.

7. A vehicle comprising:
   a frame of a vehicle body having a driving source;
   a cabin which is disposed above the frame and in which an operator rides; and
   a plurality of vibration-isolating apparatuses interposed between the frame and the cabin, the cabin being supported at the frame via the plurality of vibration-isolating apparatuses,
   wherein the plurality of vibration-isolating apparatuses are disposed such that a vibration-isolating supporting plane, which is demarcated by an imaginary plane that contains the plurality of vibration-isolating apparatuses, passes through a vicinity of a center of gravity point of the cabin.

8. The vehicle of claim 7, wherein, given that a height of the cabin is H, a length of the cabin in a front-back direction is L, and a width of the cabin is Bw, the vicinity is demarcated by a parallelepiped having dimensions, centered around the center of gravity point, of $\pm(1/4) \times H$ in a heightwise direction of the cabin, $\pm(1/4) \times L$ in the front-back direction of the cabin, and $\pm(1/4) \times Bw$ in a transverse direction of the cabin.

9. The vibration-isolating supporting structure of claim 5, wherein the cabin is supported at the frame via at least one of the plurality of vibration-isolating apparatuses which is disposed further toward a front side of the vehicle than the center of gravity point and further toward a lower side than the center of gravity point, and at least one of the plurality of vibration-isolating apparatuses which is disposed further toward a rear side of the vehicle than the center of gravity point and further toward an upper side than the center of gravity point.

10. The vibration-isolating supporting structure of claim 7, wherein the cabin is supported at the frame via at least one of the plurality of vibration-isolating apparatuses which is disposed further toward a front side of the vehicle than the center of gravity point and further toward a lower side than the center of gravity point, and at least one of the plurality of vibration-isolating apparatuses which is disposed further toward a rear side of the vehicle than the center of gravity point and further toward an upper side than the center of gravity point.

* * * * *